United States Patent
McCready

(10) Patent No.: US 8,974,220 B2
(45) Date of Patent: Mar. 10, 2015

(54) MOLD STACK FOR A PREFORM

(75) Inventor: Derek Robertson McCready, Mississauga (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 0 days.

(21) Appl. No.: 14/004,187

(22) PCT Filed: Feb. 27, 2012

(86) PCT No.: PCT/CA2012/050116
§ 371 (c)(1),
(2), (4) Date: Sep. 10, 2013

(87) PCT Pub. No.: WO2012/129682
PCT Pub. Date: Oct. 4, 2012

(65) Prior Publication Data
US 2014/0010909 A1    Jan. 9, 2014

Related U.S. Application Data

(60) Provisional application No. 61/468,813, filed on Mar. 29, 2011.

(51) Int. Cl.
| | | |
|---|---|---|
| *B29C 49/00* | (2006.01) |
| *B29C 45/40* | (2006.01) |
| *B29C 45/33* | (2006.01) |
| *B29B 11/08* | (2006.01) |
| *B29C 49/06* | (2006.01) |
| *B29K 105/00* | (2006.01) |

(52) U.S. Cl.
CPC ............. *B29C 49/0073* (2013.01); *B29C 45/40* (2013.01); *B29C 2045/4078* (2013.01); *B29B 11/08* (2013.01); *B29C 49/06* (2013.01); *B29B 2911/14333* (2013.01); *B29K 2105/258* (2013.01); *B29C 45/33* (2013.01); *B29K 2105/253* (2013.01)
USPC ........................................................ 425/525

(58) Field of Classification Search
USPC ........................................................ 425/525
See application file for complete search history.

(56) References Cited

U.S. PATENT DOCUMENTS

| | | |
|---|---|---|
| 5,158,736 A | 10/1992 | Giza |
| 6,799,962 B2 | 10/2004 | Mai et al. |
| 6,989,124 B2 | 1/2006 | Miller et al. |

(Continued)

OTHER PUBLICATIONS

PCT International Search Report; Zhang, Pengfei; Apr. 5, 2012, 3 pages.

*Primary Examiner* — Jacob Thomas Minskey

(57) ABSTRACT

There is provided a molding stack assembly (202) for producing a molded article (214), the molded article (214) including a neck finish (218) which includes a support ledge (222), the molded article (214) suitable for subsequent blow-molding into a final shaped container. The molding stack assembly (202) comprises a core insert (204), a lock ring (206), a split mold insert (208), a cavity flange (209) and a cavity insert (210) for jointly defining, in use, a molding cavity (212) for forming the molded article (214), the split mold insert (208) and the cavity flange (209) defining a split line (226) therebetween, the split line (226) being defined substantially along a portion of the support ledge (222); a biasing member (230) disposed, in use, between the cavity flange (209) and the cavity insert (210), the biasing member (230) being configured to: (a) under applied clamp force, to allow the cavity flange (209) to abut the cavity insert (210); and (b) during initial stages of the mold operation to bias the cavity flange (209) away from the cavity insert (210).

22 Claims, 5 Drawing Sheets

(56) References Cited

U.S. PATENT DOCUMENTS

| | | |
|---|---|---|
| 7,128,865 B2 | 10/2006 | Martin |
| 7,762,802 B2 | 7/2010 | Mai |
| 7,766,644 B2 | 8/2010 | Li et al. |
| 2002/0140117 A1* | 10/2002 | Russell et al. ............... 264/1.36 |
| 2009/0022844 A1* | 1/2009 | Mai et al. ...................... 425/577 |
| 2009/0155404 A1* | 6/2009 | Mai .............................. 425/525 |

* cited by examiner

MOLD STACK FOR A PREFORM

FIELD OF THE INVENTION

The present invention generally relates to, but is not limited to, a molding system, and more specifically the present invention relates to, but is not limited to, a mold stack for a preform.

BACKGROUND OF THE INVENTION

Molding is a process by virtue of which a molded article can be formed from molding material by using a molding system. Various molded articles can be formed by using the molding process, such as an injection molding process. One example of a molded article that can be formed, for example, from polyethylene terephthalate (PET) material is a preform that is capable of being subsequently blown into a beverage container, such as, a bottle and the like.

As an illustration, injection molding of molding material (such as, PET, for example) involves heating the PET material (or other suitable molding material for that matter) to a homogeneous molten state and injecting, under pressure, the so-melted PET material into a molding cavity defined, at least in part, by a female cavity piece and a male core piece mounted respectively on a cavity plate and a core plate of a mold. The cavity plate and the core plate are urged together and are held together by clamp force, the clamp force being sufficient to keep the cavity and the core pieces together against the pressure of the injected PET material.

The molding cavity has a shape that substantially corresponds to a final cold-state shape of the molded article to be molded. The so-injected PET material is then cooled to a temperature sufficient to enable ejection of the so-formed molded article from the molding cavity. When cooled, the molded article shrinks inside of the molding cavity and, as such, when the cavity and core plates are urged apart, the molded article tends to remain associated with the core piece. Accordingly, by urging the core plate away from the cavity plate, the molded article can be subsequently fully demolded by ejecting it off the core piece. Ejection structures are known to assist in removing the molded articles from the core halves. Examples of the ejection structures include stripper plates, stripper rings and neck rings, ejector pins, etc.

When dealing with molding a preform that is capable of being subsequently blown into a beverage container, one consideration that needs to be addressed is forming a so-called "neck region". Typically and as an example, the neck region includes (i) threads (or other suitable structure) for accepting and retaining a closure assembly (ex. a bottle cap), and (ii) an anti-pilferage assembly to cooperate, for example, with the closure assembly to indicate whether the end product (i.e. the beverage container that has been filled with a beverage and shipped to a store) has been tampered with in any way. The neck region may comprise other additional elements used for various purposes, for example, to cooperate with parts of the molding system (ex. a support ledge, etc.). As is appreciated in the art, the neck region can not be easily formed by using the cavity and core halves. Traditionally, split mold inserts (sometimes referred to by those skilled in the art as "neck rings") have been used to form the neck region.

With reference to FIG. 1, a section along a portion of an injection mold 50 illustrates a typical molding stack assembly 52 that can be arranged (in use) within a molding machine (not depicted). The description of FIG. 1 that will be presented herein below will be greatly simplified, as it is expected that one skilled in the art will appreciate configuration of other components of the injection mold 50 that will not be discussed in the following description.

The molding stack assembly 52 includes a split mold insert pair 54 that together with a mold cavity insert 56, a gate insert 58 and a core insert 60, defines a molding cavity 62. Molding material can be injected into the molding cavity 62 from a source of molding material (not depicted) via a receptacle (not separately numbered) in the gate insert 58 to form a molded article, which in this example would be a preform suitable for subsequent blow-molding into a final-shaped container.

In order to facilitate forming of the neck region of the molded article and subsequent removal of the molded article therefrom, the split mold insert pair 54 comprises a pair of complementary split mold inserts (not separately numbered) that are mounted on adjacent slides of a slide pair (not depicted). The slide pair is slidably mounted on a top surface of a stripper plate (not depicted). As commonly known, and as, for example, generally described in U.S. Pat. No. 6,799,962 to Mai et al (granted on Oct. 5, 2004), the stripper plate (not depicted) is configured to be movable relative to the cavity insert 56 and the core insert 60, when the mold is arranged in an open configuration, whereby the slide pair, and the complementary split mold inserts mounted thereon, can be laterally driven, via a cam arrangement (not shown) or any other suitable known means, for the release of the molded article from the molding cavity 62.

Several types of the split mold insert pair 54 are known in the art. For example, the split mold insert pair 54 can be of a cavity-lock type or a core-lock type (depicted in FIG. 1), depending on an arrangement that is used for locking the split mold insert pair 54, in use, relative to the mold cavity insert 56 and the core insert 60. The split mold insert pair 54 can also define a portion of the neck region (as is the case in FIG. 1) or the whole of the neck region or, put another way, "encapsulate" the neck region. One of the functions performed by the split mold insert pair 54 is to assist in ejecting the molded article off the core insert 60 by "sliding" the molded article off the core insert 60.

An example of the latter is disclosed in a co-owned U.S. Pat. No. 6,989,124 issued on Jan. 24, 2006 to Miller et al., which teaches an injection molding method and apparatus for ejecting a molded plastic article from a mold. A lifting structure and/or step is provided with a lifting portion which is configured to contact substantially one half of an end of the molded plastic article along a line substantially perpendicular to the lifting direction. Since the molded plastic article is lifted by its end, the article does not have to be solidified at its interior, thus allowing earlier removal of the article from the mold, reducing cycle time. A tapered surface forms an acute angle with respect to the lifting portion to form a tight seal with the mold, preventing leakage. Preferably, the neck ring engages only an outer circumferential portion of the molded plastic article during a majority of a mold opening stroke.

Co-owned U.S. Pat. No. 7,128,865 issued to Martin on Oct. 31, 2006 discloses an injection molding method and apparatus for ejecting a molded plastic preform from a mold. A first lifting structure and/or step is configured to have an inner surface with an area for sealing and aligning with a complementary surface on a core, and to have an upper surface with an area for sealing and aligning with a complementary surface on a second lifting structure, said upper surface of said first lifting structure being configured to lift a molded plastic preform from the injection mold in a lifting direction for a first period of time, the lower portion of the molded plastic preform lying in a plane substantially perpendicular to the lifting direction. A second lifting structure and/or step is configured to have an inner surface configured to lift an outer surface of the molded plastic preform from the injection mold in the lifting direction for a second period of time, the outer surface of the molded plastic preform including structure lying in a plane substantially parallel with the lifting direction. Since the molded plastic preform is lifted by its end, the preform does not have to be solidified at its interior, thus allowing earlier removal of the preform from the mold, reducing cycle time.

It is noted that in the illustrated example of FIG. 1, a first split line 80 is formed where the split mold insert pair 54 mates the mold cavity insert 56 and a second split line 82 is formed where the split mold insert pair 54 mates the core insert 60. It can be said that the first split line 80 is formed in the transition region of the preform and the second split line 82 is formed in the upper-thread region of the preform.

U.S. Pat. No. 5,158,736 discloses a cavity stripper, which is positioned between two mold plates of a mold is used to remove a molded U-shaped article from a cup in one of the mold plates. The cavity stripper is movably attached to the mold plate that houses the cup. The cavity stripper is spring loaded such that it follows the moving mold plate for a short distance and by mechanical interference urges the molded article to remain with the mandrel during opening operations.

SUMMARY OF THE INVENTION

According to a first broad aspect of the present invention, there is provided a molding stack assembly for producing a molded article, the molded article including a neck finish which includes a support ledge, the molded article suitable for subsequent blow-molding into a final shaped container. The molding stack assembly comprises a core insert, a lock ring, a split mold insert, a cavity flange and a cavity insert for jointly defining, in use, a molding cavity for forming the molded article, the split mold insert and the cavity flange defining a split line therebetween, the split line being defined substantially along a portion of the support ledge; a biasing member disposed, in use, between the cavity flange and the cavity insert, the biasing member being configured to: (a) under applied clamp force, to allow the cavity flange to abut the cavity insert; and (b) during initial stages of the mold operation to bias the cavity flange away from the cavity insert.

According to a second broad aspect of the present invention, there is provided, in a molding stack assembly for producing a molded article, the molded article including a neck finish which includes a support ledge, the molded article suitable for subsequent blow-molding into a final shaped container, a core insert, a lock ring, a split mold insert, a cavity flange and a cavity insert for jointly defining, in use, a molding cavity for forming the molded article, the split mold insert and the cavity flange defining a split line therebetween, the split line being defined substantially along a portion of the support ledge, an improvement that comprises a biasing member disposed, in use, between the cavity flange and the cavity insert, the biasing member being configured to: (a) under applied clamp force, to allow the cavity flange to abut the cavity insert; and (b) during initial stages of the mold operation to bias the cavity flange away from the cavity insert.

These and other aspects and features of non-limiting embodiments of the present invention will now become apparent to those skilled in the art upon review of the following description of specific non-limiting embodiments of the invention in conjunction with the accompanying drawings.

DESCRIPTION OF THE DRAWINGS

A better understanding of the non-limiting embodiments of the present invention (including alternatives and/or variations thereof) may be obtained with reference to the detailed description of the non-limiting embodiments along with the following drawings, in which.

DETAILED DESCRIPTION OF EMBODIMENTS

Figure 1:
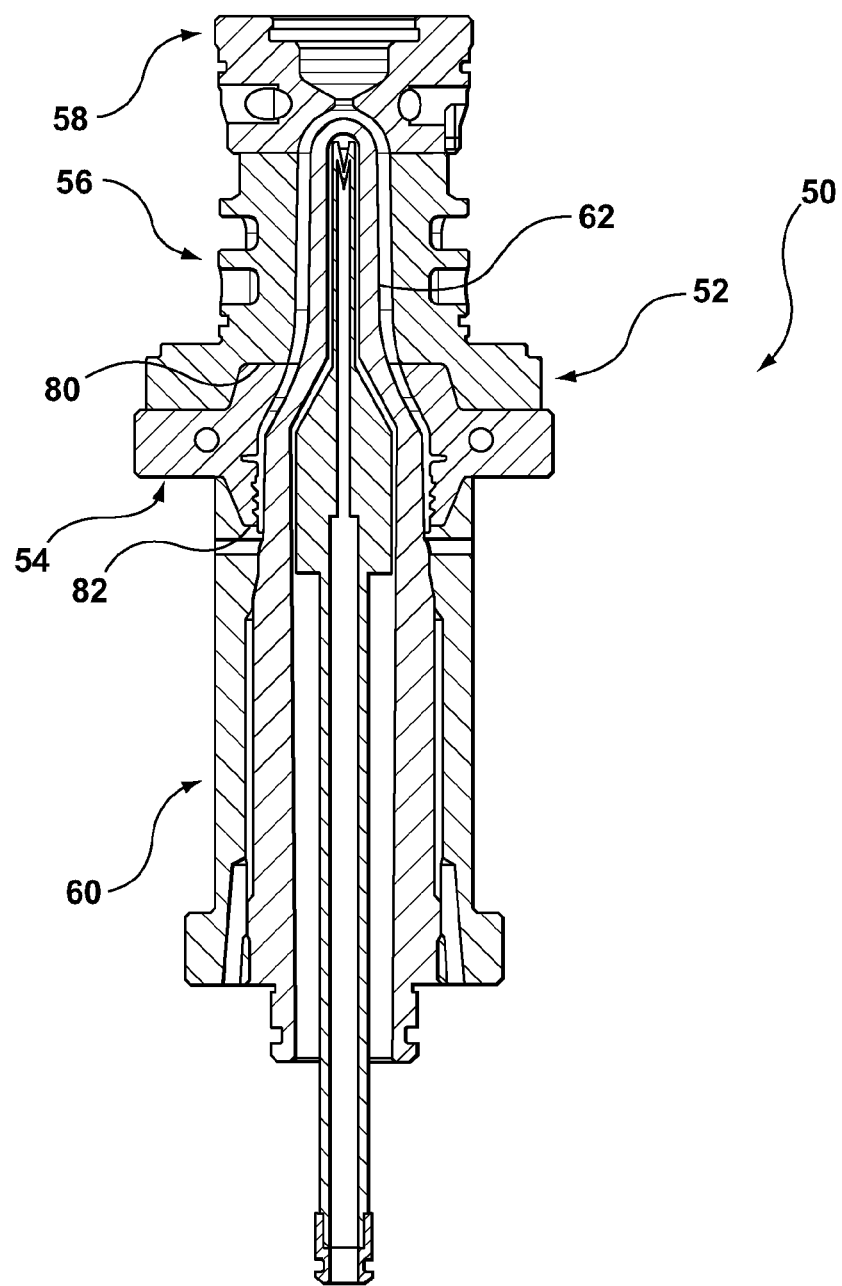
FIG. 1 is a cross-section view of a portion of an injection mold that incorporates a typical molding stack assembly 52, implemented in accordance with known techniques.
Figure 2:
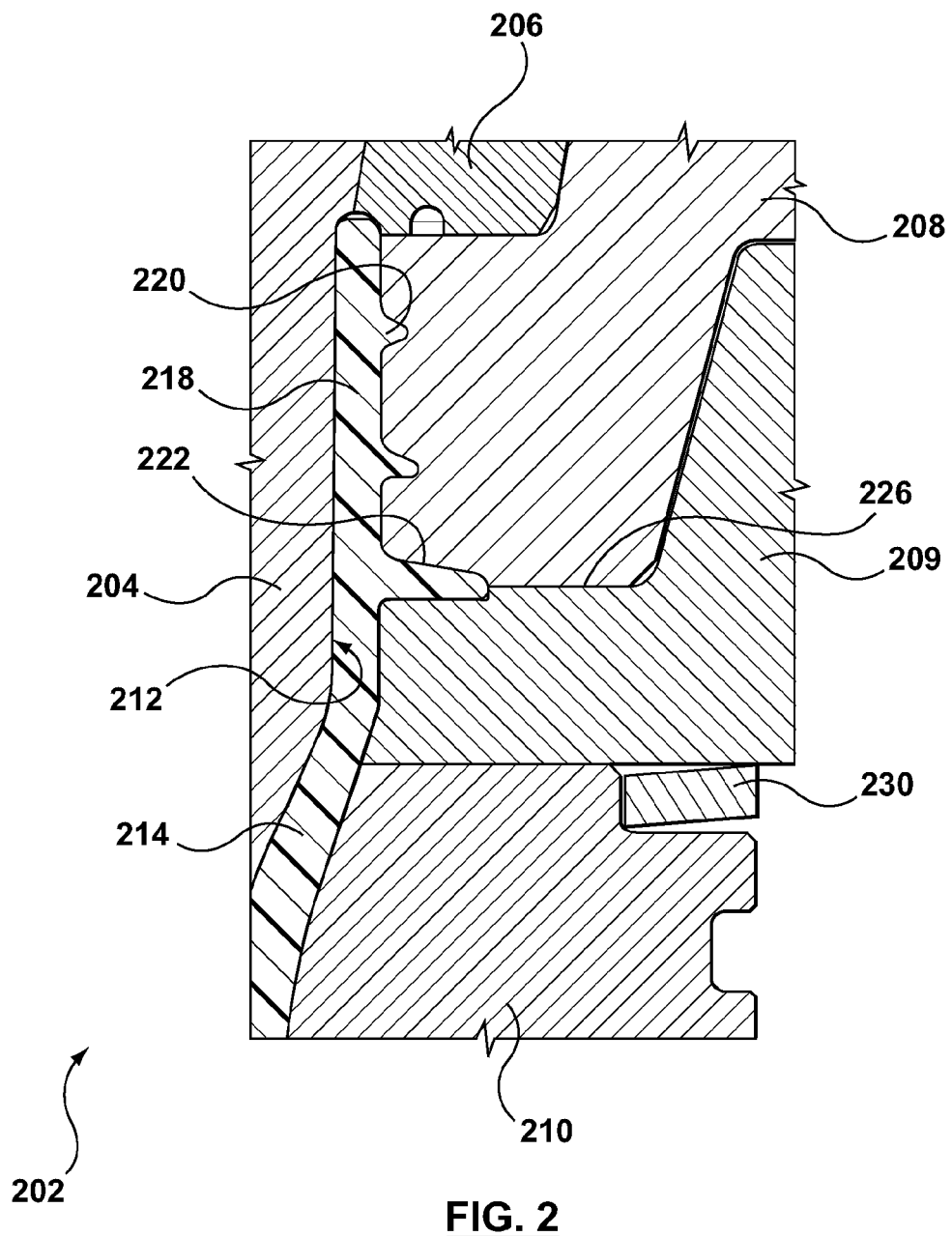
FIG. 2 depicts cross-section view of a portion of a molding stack assembly implemented in accordance with a non-limiting embodiment of the present invention.

FIG. 2 depicts a portion of a molding stack assembly 202 implemented in accordance with a non-limiting embodiment of the present invention. The molding stack assembly 202 comprises a core insert 204, which can be implemented substantially in accordance with known techniques, as was described above with reference to FIG. 1. The molding stack assembly 202 further comprises a lock ring 206. Even though not described with reference to the molding stack assembly 52 described above with reference to FIG. 1, implementation of the lock ring 206 is known in the art and, as such, will not be described here at much length.

The molding stack assembly 202 further comprises a split mold insert 208, a cavity flange 209 and a cavity insert 210. As can be clearly appreciated from the illustration of FIG. 2, the core insert 204, the lock ring 206, the split mold insert 208, the cavity flange 209 and the cavity insert 210 jointly define a molding cavity 212 for forming therein, in use, a molded article 214, which in this cases is implemented as preform suitable for subsequent blow-molding into a final shaped container, such as a beverage bottle and the like.

It is noted that the split mold insert 208 is configured to define, in use, various aspects of a neck finish 218 of the molded article 214, and more specifically, a thread portion 220 and a portion of a support ledge 222. It is noted that a second portion of the support ledge 222 is formed by the cavity flange 209. In other words, it can be said that a split line 226 is defined between the split mold insert 208 and the cavity flange 209 and, more specifically, the split line 226 is defined substantially along a portion of the support ledge 222.

According to embodiments of the present invention, there is also provided a biasing member 230. The biasing member is disposed between the cavity insert 210 and the cavity flange 209. Generally speaking, the biasing member 230 is configured to (a) allow the cavity flange 209 to abut (via the biasing member 230, so to speak) the cavity insert 210 under applied clamp force and (b) during initial stages of the mold operation to bias the cavity flange 209 away from the cavity insert 210.

Figure 3:
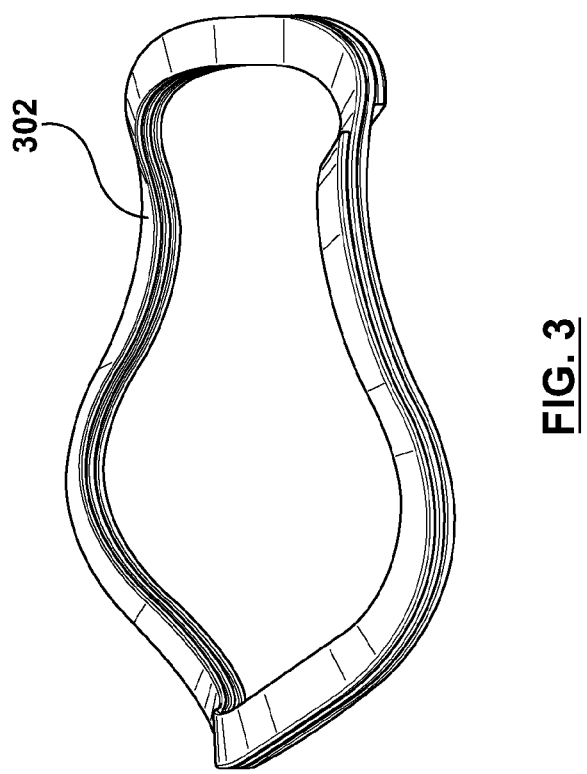
FIG. 3 depicts a perspective view of an implementation of a biasing member of the molding stack assembly of FIG. 1.

In a specific embodiment of the present invention, the biasing member 230 can be implemented as a wave spring 302 depicted in a perspective view in FIG. 3. An example implementation of the wave spring 302 can be embodied in an off-the-shelve wave spring 302 available form Smalley Steel Ring Company of 555 Oakwood Road, Lake Zurich, Ill. 60047, USA. In other embodiments of the present invention, the biasing member 203 can be implemented as a disk spring and the like. In some embodiments of the present invention, the biasing member 230 can be made of stainless steel. In other embodiments of the present invention, the biasing member 230 can be made of carbon steel. Other implementations are, of course, possible too.

Figure 4:
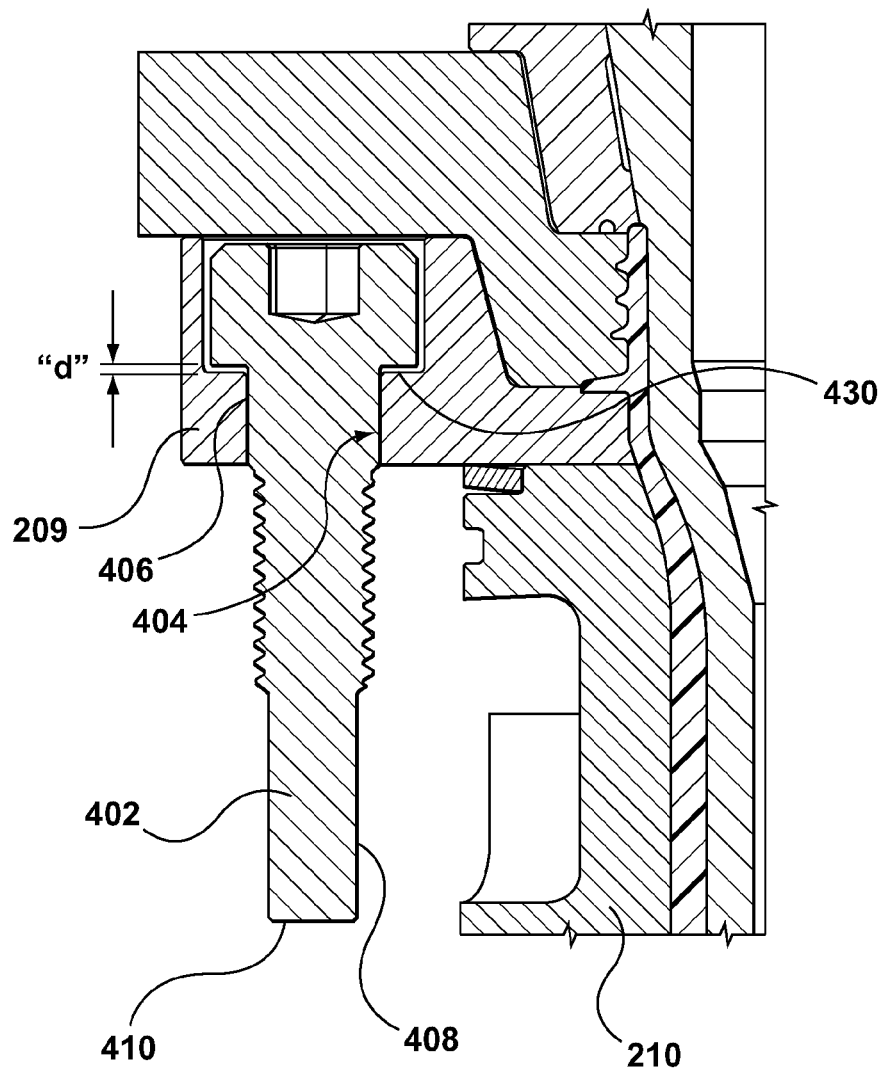
FIG. 4 depicts a cross section through a portion of the molding stack assembly of FIG. 2.
Figure 5:
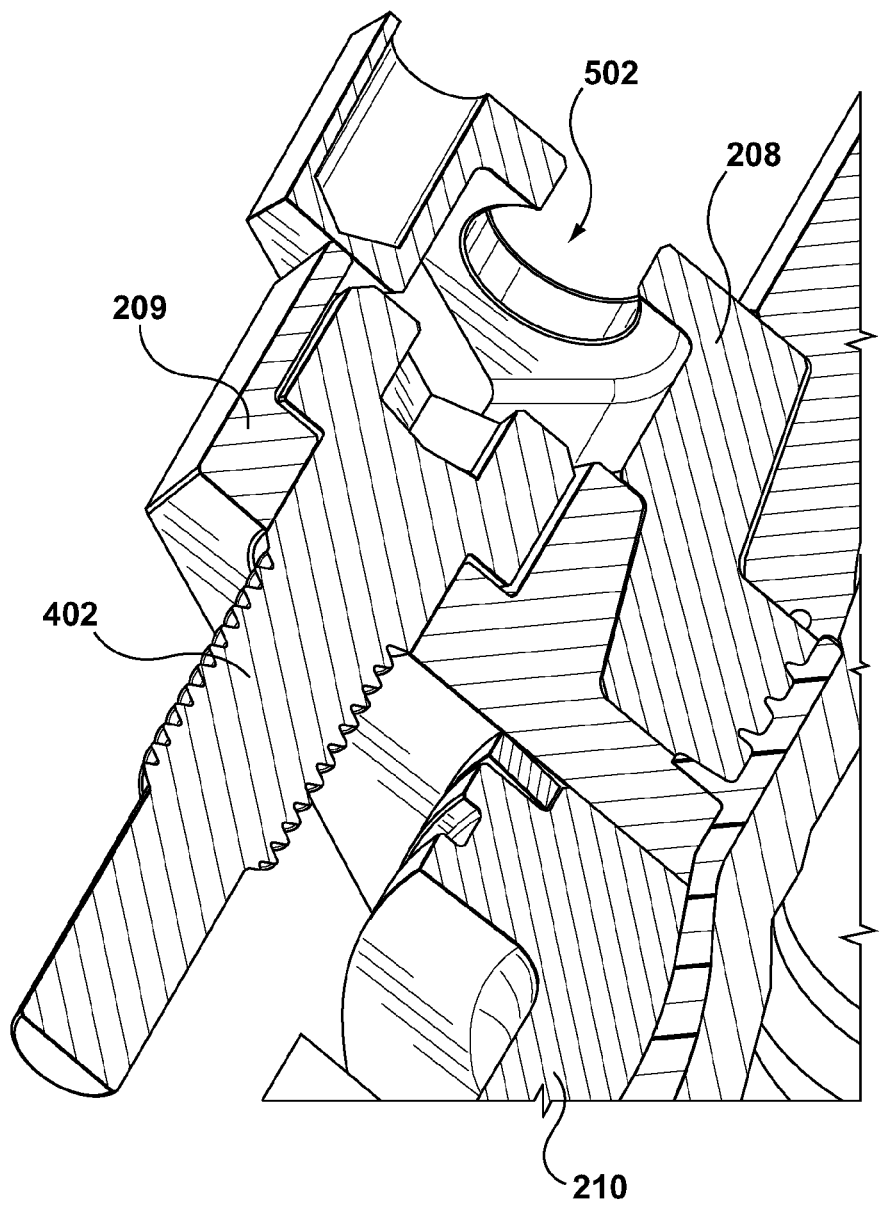
FIG. 5 depicts a perspective cross-sectional view of a portion of the molding stack assembly of FIG. 2.

Returning to the description of FIG. 2 and with further reference to FIG. 4 and FIG. 5, in which FIG. 4 depicts a cross section through a portion of the molding stack assembly 202 and FIG. 5 depicts a perspective cross-sectional view of a portion of the molding stack assembly 202; the molding stack assembly 202 being implemented in accordance with non-limiting embodiments of the present invention.

It is noted that the cavity flange 209 is mounted onto a cavity plate (not depicted), the cavity plate housing the cavity insert 210. Within embodiments of the present invention, the cavity flange 209 is coupled to the cavity plate (not depicted) in a floating arrangement. In the depicted embodiments, the cavity flange 209 is mounted onto the cavity plate (not depicted) by means of a bolt 402. An outside diameter 406 of the bolt 402 and an inside diameter of a bore 404 in the cavity flange 209 are selected such as to limit the amount of float of the cavity flange 209 in a lateral direction, i.e. left-right direction as viewed in FIG. 4, for example.

A lower outside diameter 408 of the bolt 402 and a corresponding inner diameter of a bore in the cavity plate (both not depicted) are selected such as to position the bolt 402 and, therefore, the cavity flange 209 relative to the cavity plate (not depicted) and, therefore, relative to the cavity insert 210. A lower bottom landing 410 of the bolt 402 bottoms out in the bore of the cavity plate (both not depicted) to accurately control the stroke at all four corners thereof in other words, the lower bottom landing 410, in a sense, acts as a stroke de-limiter, as will be explained in greater detail herein below.

It should be noted that the shape of the bolt 402 can be varied and, as such, it is not limited to those embodiments depicted in FIG. 4 and FIG. 5. Actually, any suitable retainer can be used to implement embodiments of the coupling between the cavity flange 209 and the cavity plate (not depicted).

As is best seen in FIG. 5, for example, the split mold insert 208 is also provided with an aperture 502 for mounting the split mold insert 208.

Having described the architecture of the molding stack assembly 202 implemented in accordance with non-limiting embodiments of the present invention, an operation of same will now be described in greater detail.

During a mold-close operation, under applied clamp force, the split mold insert 208 is urged towards the cavity flange 209 and the cavity insert 210, effectively compressing the biasing member 230.

During the initial phase of a mold-open operation, the biasing member 230 urges the cavity flange 209 away from the cavity insert 210. This, in turn, means that the cavity flange 209 follows the split mold insert 208 away from the cavity insert 210, effectively assisting in separating the molded article 214 away from the molding cavity portion defined within the cavity insert 210. It is noted that the biasing member 230 also, in effect, pushes back on cavity insert 210 to ensure that it does not follow with the cavity flange 209.

It is noted that a representative stroke "d" (FIG. 4) of the cavity flange 209 relative to the cavity insert 210 can be, for example, 0.5 mm. Other degrees of stroke will be possible of course. It will be recalled, that lower bottom landing 410 is also acting as a delimiter of the stroke. As such, it should be appreciated that the combination of (i) the distance between a head landing 430 of the bolt 402 and the cavity flange 209 and (ii) the lower landing 410 cooperate to delimit the stroke "d".

A technical effect of embodiments of the present invention can include mitigation of the stretch neck problems of the prior art solutions, due at least in part, to the ability of the cavity flange 209 to travel with the split mold insert 208 during the initial phase of the mold-open operation, which in part, helps with urging the molded article 214 away from the cavity insert 210. Another technical advantage of embodiments of the present invention, may include compensation for taper mis-alignment due at least partially to the compensating nature of the biasing member 230. Another technical advantage may include improved tonnage distribution. It should be noted that not each every technical advantage needs to be enjoyed in each and every embodiment of the present invention.

Description of the non-limiting embodiments of the present inventions provides examples of the present invention, and these examples do not limit the scope of the present invention. It is to be expressly understood that the scope of the present invention is limited by the claims. The concepts described above may be adapted for specific conditions and/or functions, and may be further extended to a variety of other applications that are within the scope of the present invention. Having thus described the non-limiting embodiments of the present invention, it will be apparent that modifications and enhancements are possible without departing from the concepts as described.

What is claimed is:

1. A molding stack assembly for producing a molded article, the molded article including a neck finish which includes a support ledge, the molded article suitable for subsequent blow-molding into a final shaped container, the molding stack assembly comprising:
   a core insert, a lock ring, a split mold insert, a cavity flange and a cavity insert for jointly defining, in use, a molding cavity for forming the molded article, the split mold insert-RAO and the cavity flange defining a split line therebetween, the split line being defined substantially along a portion of the support ledge;
   a biasing member disposed, in use, between the cavity flange and the cavity insert, the biasing member being configured to:
   (a) under applied clamp force, to allow the cavity flange to abut the cavity insert; and
   (b) during initial stages of a mold-open operation to bias the cavity flange away from the cavity insert such that the cavity flange is operable to travel with the split mold insert during the initial phase of the mold-open operation.

2. The molding stack assembly of claim 1, wherein the biasing member is further configured to push the cavity flange over a stroke "d".

3. The molding stack assembly of claim 1, wherein the biasing member is implemented as a wave spring.

4. The molding stack assembly of claim 1, wherein the biasing member is implemented as a disk spring.

5. The molding stack assembly of claim 1, wherein the cavity flange is coupled to a cavity plate in a floating arrangement.

6. The molding stack assembly of claim 5, wherein the cavity flange is coupled to the cavity plate by a retainer.

7. The molding assembly stack of claim 6, wherein the retainer comprises an outside diameter and wherein the cavity flange comprises an inside diameter, and wherein the outside diameter and the inside diameter are configured to cooperate to limit the amount of float of the cavity flange in a lateral direction.

8. The molding stack assembly of claim 6, wherein the retainer comprises a lower bottom landing and the lower bottom landing in configured, at least partially, to delimit a stroke "d" of the cavity flange.

9. The molding stack assembly of claim 8, in the stroke "d" is approximately 0.5 mm.

10. In a molding stack assembly for producing a molded article, the molded article including a neck finish which includes a support ledge, the molded article suitable for subsequent blow-molding into a final shaped container, a core insert, a lock ring, a split mold insert, a cavity flange and a cavity insert for jointly defining, in use, a molding cavity for forming the molded article, the split mold insert and the cavity flange defining a split line therebetween, the split line being defined substantially along a portion of the support ledge, an improvement comprising:
 a biasing member disposed, in use, between the cavity flange and the cavity insert, the biasing member being configured to:
  (a) under applied clamp force, to allow the cavity flange to abut the cavity insert; and
  (b) during initial stages of a mold-open operation to bias the cavity flange away from the cavity insert such that the cavity flange is operable to travel with the split mold insert during the initial phase of the mold-open operation.

11. The molding stack assembly of claim 10, wherein the biasing member is further configured to push the cavity flange over a stroke "d".

12. The molding stack assembly of claim 10, wherein the biasing member is implemented as a wave spring.

13. The molding stack assembly of claim 10, wherein the biasing member is implemented as a disk spring.

14. The molding stack assembly of claim 10, wherein the cavity flange is coupled to a cavity plate in a floating arrangement.

15. The molding stack assembly of claim 14, wherein the cavity flange is coupled to the cavity plate by a retainer.

16. A cavity plate assembly of an injection mold for producing a preform that is capable of being subsequently blown into a beverage container, the preform including a neck finish which includes a support ledge, the cavity plate assembly comprising:
 a cavity insert and a cavity flange of a molding stack assembly that together define part of a molding cavity, wherein the cavity flange and a split mold insert of the molding stack assembly define a split line therebetween that is substantially along a portion of the support ledge;
 a cavity plate, the cavity plate housing the cavity insert; and
 the cavity flange is coupled to the cavity plate in a floating arrangement and biased therefrom such that:
  (a) under applied clamp force, to allow the cavity flange to abut the cavity insert; and
  (b) during initial stages of a mold-open operation to bias the cavity flange away from the cavity insert such that the cavity flange is operable to travel with the split mold insert during the initial phase of the mold-open operation.

17. The cavity plate assembly of claim 16, further comprising a biasing member disposed between the cavity flange and the cavity insert.

18. The cavity plate assembly of claim 17, wherein the biasing member is implemented as one of a wave spring and a disk spring.

19. The cavity plate assembly of claim 16, wherein the cavity flange is coupled to the cavity plate by a retainer.

20. The cavity plate assembly of claim 18, wherein the retainer comprises an outside diameter and wherein the cavity flange comprises an inside diameter, and wherein the outside diameter and the inside diameter are configured to cooperate to limit the amount of float of the cavity flange in a lateral direction.

21. The cavity plate assembly of claim 20, wherein the retainer comprises a lower bottom landing and the lower bottom landing in configured, at least partially, to delimit a stroke "d" of the cavity flange.

22. The cavity plate assembly of claim 21, in the stroke "d" is approximately 0.5 mm.

* * * * *